UNITED STATES PATENT OFFICE.

WILLIAM T. HALE, OF DODGE CITY, KANSAS.

VULCANIZABLE COMPOSITION.

1,300,263.  Specification of Letters Patent.  Patented Apr. 15, 1919.

No Drawing.  Application filed May 25, 1918. Serial No. 236,444.

*To all whom it may concern:*

Be it known that I, WILLIAM T. HALE, a citizen of the United States, residing at Dodge City, in the county of Ford and State of Kansas, have invented new and useful Improvements in Vulcanizable Composition, of which the following is a specification.

The present invention relates to a novel and improved vulcanizable composition, and the primary object of the invention is to provide a vulcanizable composition which can be manufactured inexpensively and which can be so used in the repair of punctures, cuts, or breaks in pneumatic inner tubes, tire casings and other rubber goods as to produce a neater and stronger repair, requiring less time and labor and much less material than is the case with the usual vulcanizable composition and the methods of using them.

Heretofore, in vulcanizing punctures and cuts in pneumatic inner tubes, it has been necessary to first clean the surface of the tube around the puncture or cut, and if the cut were of substantial size, a piece of semi-cured rubber with cement thereon was placed beneath the cut, cement being applied around the upper side of the cut and a rubber patch applied over such cement. In the case of punctures of small size, cement was applied to the upper side of the tube around the puncture and a rubber patch applied to such cement. The repair thus made was then vulcanized. Such a procedure consumed a considerable amount of cement, rubber, and, in some instances, fabric which was placed beneath the patch, and where such repairs were made on a large scale they consumed a great deal of time and labor. The finished repair was unsightly, and, moreover, it increased the thickness of the wall of the tube. According to the present invention, the cost of repairing and vulcanizing punctures, cuts, or breaks in inner tubes and other rubber products is greatly reduced, the repair possesses greater strength and is more durable, and the repair presents a neat appearance.

The vulcanizable composition generally preferred consists of caoutchouc or raw rubber or sheet unvulcanized gum dissolved by any suitable solvent therefor such as ether, benzene, or high-test gasolene, the rubber or gum and its solvent being used in such proportion as to form a plastic and somewhat tacky mixture when the composition is to be used for repairing punctures, cuts and the like, or, when the composition is to be used as a cement, the proportion of solvent will be suitably increased to render the composition thin enough to be spread as the ordinary cement upon the surface to which it is to be applied, the dissolved rubber being mixed with plumbic oxid or red lead, plumbic acetate, sulfid of mercury, asphalt and sulfur in suitable proportions to make a mixture of the proper consistency, the composition being made as thin or as stiff as the work requires by using more or less of the solvent, high-test gasolene being preferably used for this purpose.

While, as indicated, the proportions of the constituents of the composition may be varied, the following proportions of these constituents is given as an example:—

| | |
|---|---|
| Rubber or gum | 1 pound. |
| Solvent | 3 pints. |
| Plumbic oxid or red lead | 7 ounces. |
| Plumbic acetate | 2 ounces. |
| Sulfid of mercury | 7 ounces. |
| Asphalt | 3 ounces. |
| Sulfur | $2\frac{1}{2}$ to 5% of the rubber used. |

The composition is prepared preferably in the following way at normal temperature:—The rubber or gum is first dissolved in the high-test gasolene or other solvent. The plumbic oxid, the plumbic acetate, the sulfid of mercury and the sulfur in dry form are then ground together to thoroughly mix them in the form of a very fine powder. These powders are then wetted with high-test gasolene or other solvent and made into a putty. The asphalt is then mixed with this putty, the light weight of the asphalt in comparison with the weight of the oxids preventing settling of the oxids. This preparation is then incorporated with the rubber solution and the resulting product is then ready for use.

Either the plumbic oxid or the red lead has the properties of a drier, and hence hasten adhesion or sticking together of the parts to be repaired by the composition. The plumbic acetate or sugar of lead imparts sticky or tacky properties to the composition and it neutralizes any alkali base contained in the plumbic oxid. The sulfid of mercury or vermilion, which is preferred, serves as a filler to give added body to the composition and also it, together with the plumbic acetate and plumbic oxid, contains some sulfur which aids in vulcanization. The asphalt imparts stickiness and stringy characteristics to the composition and it also gives the composition elastic strength. The sulfur constituent supplies the necessary amount of sulfur for vulcanization. The constituents named are preferably used as it has been found that the best results are obtained thereby. However, the plumbic acetate might be replaced by acetic acid, although the results obtained would be inferior, and, also, other fillers, such as soapstone or zinc oxid, or other inert powder insoluble in water, might be used in place of the sulfid of mercury, although the results in such cases would also be inferior. The asphalt may be omitted, but inferior results would be obtained.

The methods of using a vulcanizable composition made in accordance with the present invention are as follows:—In repairing punctures or cuts in pneumatic inner tubes or similar rubber goods, the rubber around and on the outer side of the puncture or cut is first cleaned with gasolene or other cleansing liquid, or, it may be cleaned by the use of a piece of abrasive fabric or the like. The puncture or cut is then packed full of the compound and then subjected to vulcanization for from ten to fifteen minutes, the vulcanization being performed otherwise in the usual way. In the case of a large cut or tear, the rubber around the edges and at the outer side of the cut or tear is cleaned as above and a piece of paper may be placed on the under side of the cut or tear, or, if desired, a piece of thin rubber, such as an old inner tube cut in a narrow strip and coated with the composition, may be placed on the under side of the cut or tear. The edges of the cut or tear are then coated evenly with the composition, and after the composition on such edges has dried for a few minutes, such edges are pressed firmly and closely together so that no air space is left between such edges. The upper or outer surface of the cut or tear is then smoothed and a piece of paper or cloth is then placed over such surface. The repair thus made is then subjected to vulcanization as in the preceding instance, the tube having a smooth even surface in the zone of the repair. In repairing a cut in a tire casing, the cut is first cleaned thoroughly, the edges of the cut are then coated thoroughly with the composition, the same being permitted to dry for a few minutes, whereupon the coated edges of the cut are stuck together closely and firmly and the repair thus made is then vulcanized for fifteen or twenty minutes. In using the composition as a cement for retreading or repairing tire casings, the parts of the casing are supplied with three or four coats of the composition applied preferably with a paint brush, each coating being allowed to dry a short time before the next coat is applied, this operation requiring thirty to forty minutes, and the job is then vulcanized for from thirty to forty minutes.

A vulcanizable composition made in accordance with the present invention enables greatly superior repairs to be made with the expenditure of much less time and at less cost than has been possible heretofore, small punctures and also cuts can be repaired without the use of patches, and, furthermore, butt joints of great strength and durability can be made in tubes or other rubber goods. In all cases, the repairs can be made without the necessity of applying a patch to the upper or outer side of the cut, break or tear, and hence the thickness of the tube is not increased at the zone of the repair. The tacky property of the composition in conjunction with its quick drying property causes the edges of the cut or break to adhere firmly a few moments after the composition has been applied thereto, thereby enabling the vulcanizing operation to be performed practically immediately after the composition has been applied to the repair, and hence a greatly increased number of repairs can be made in a given time as compared with the vulcanization methods heretofore used. The composition when subjected to vulcanization is not only thoroughly vulcanized and united to the adjacent edges of the rubber, but the composition possesses great elastic strength and, when subjected to tension, it does not become unduly stretched or attenuated.

I claim as my invention:

1. A vulcanizable composition comprising dissolved rubber or caoutchouc, plumbic oxid, a compound having the formula $CH_3.CO_2-X$, in which X is either $\frac{1}{2}Pb.1\frac{1}{2}aq.$ or hydrogen, a filler, and sulfur.

2. A vulcanizable composition comprising dissolved unvulcanized rubber or caoutchouc, an oxid of lead, a filler, asphalt, and sulfur.

3. A vulcanizable composition comprising unvulcanized rubber or caoutchouc, a solvent therefor, plumbic oxid, plumbic acetate, a filler, and sulfur.

4. A vulcanizable composition comprising unvulcanized rubber or caoutchouc, a solvent therefor, plumbic oxid, plumbic acetate, sulfid of mercury, and sulfur.

5. A vulcanizable composition comprising rubber or caoutchouc, a solvent therefor, plumbic oxid, a compound having the formula $CH_3.CO_2$—X, in which X is either $\frac{1}{2}Pb.1\frac{1}{2}aq.$ or hydrogen, a filler, asphalt, and sulfur.

6. A vulcanizable composition comprising unvulcanized rubber or caoutchouc, a solvent therefor, plumbic oxid, plumbic acetate, sulfid of mercury, asphalt, and sulfur.

In testimony whereof I have hereunto set my hand in presence of two subscribing witnesses.

WILLIAM T. HALE.

Witnesses:
  CHAS. S. HYER,
  JAMES L. NORRIS.